United States Patent Office 3,433,128
Patented Mar. 18, 1969

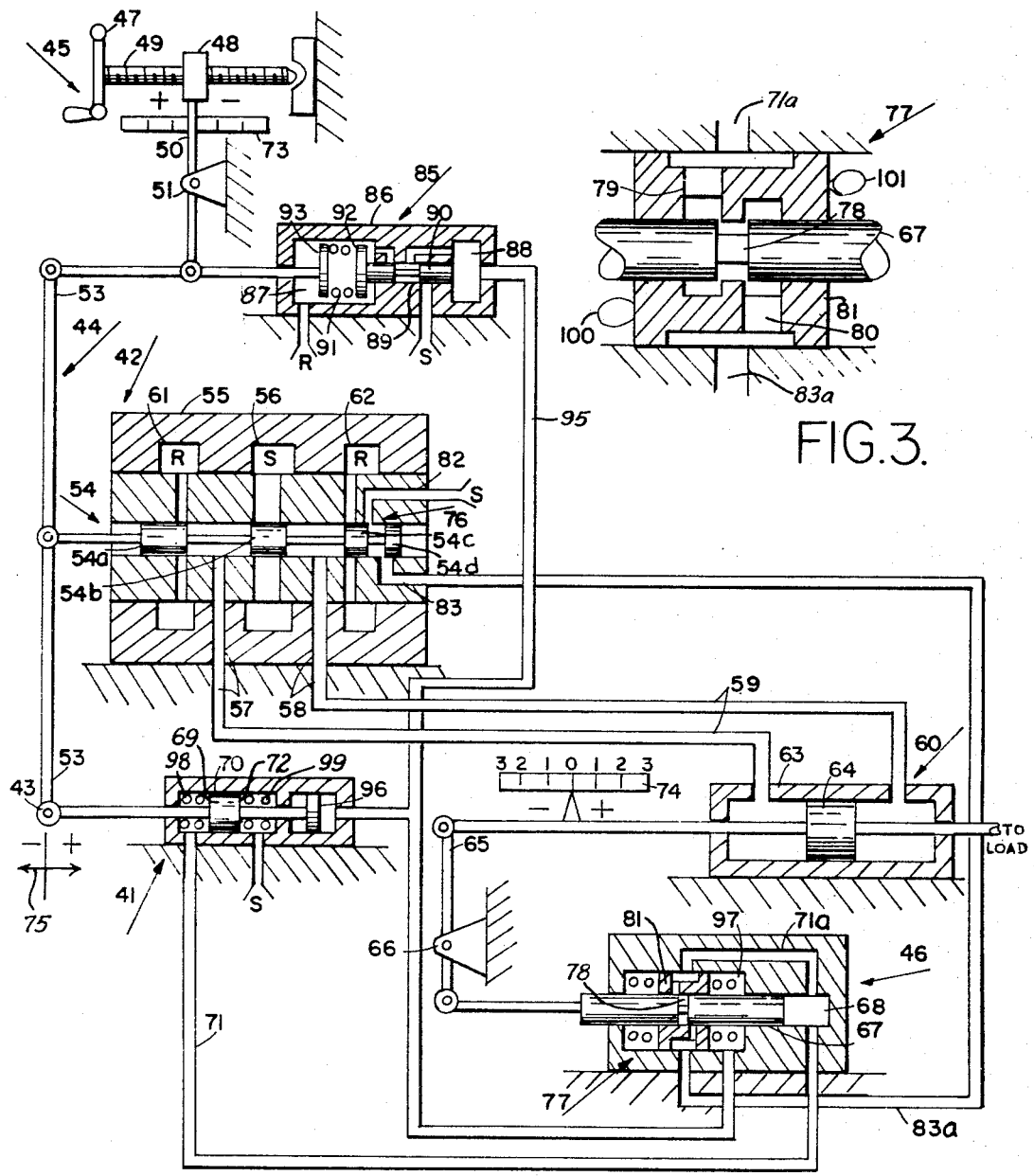

3,433,128
HYDRAULIC FEEDBACK SYSTEM
Paul F. Hayner, 5 Colony Road, Lexington, Mass.
02173, and Lawrence W. Sharpe, P.O. Box 16,
Glencliff, N.H. 03238
Filed Oct. 19, 1966, Ser. No. 587,742
U.S. Cl. 91—384                  15 Claims
Int. Cl. F15b 9/10, 13/16, 21/00

ABSTRACT OF THE DISCLOSURE

A hydraulically operated mechanism for positioning a remote load in accordance with the position of a local input member. Movement of the input member operates a control valve which transmits fluid pressure to an actuator which displaces the load and also actuates a mechanism which transmits feedback fluid pressure which repositions the control valve. Errors which accumulate due to leakage, fluid expansion due to temperature, etc. are corrected each time the system becomes static, even although the input member and the load may be displaced from their central positions.

---

This invention relates to hydraulic position feedback systems and more particularly to such a system including means for eliminating and correcting position drift in the system at all system positions.

Hydraulic position feedback systems include means for applying negative feedback from the output to the input of the system so that the output follows the input and both move to corresponding positions. Thus, the system is dynamic as long as the output is not in a position which corresponds to the position of the input and as the output moves closer and closer to the corresponding position, the feedback reduces the dynamic action. When the output reaches the position which correspond to the position of the input, the system becomes static. Thus, by virtue of the negative feedback, the output tracks the input position. As often occurs in such systems, changes in a load moved by the output, changes in hydraulic leakage or changes in the volume of the hydraulic feedback system due to changes in fluid temperature, result in an error in the position feedback and so the position of the output does not properly follow the position of the input. The system gets out of calibration. A system for correcting this type of error is described in a copending application entitled, "Hydraulic Feedback System," Ser. No. 661,151, filed on even date herewith by Paul F. Hayner and Lawrence W. Sharpe and assigned to the same assignee as is the instant application.

The above mentioned copending application describes a hydraulic positioning system in which the feedback action is eliminated over a very brief range of operation centered at the neutral or zero position of the system, so that each time the system is positioned at the neutral or zero position, any accumulated error in the feedback system, for reasons stated above is corrected. More particularly, the feedback is eliminated when the system is positioned at neutral by eliminating the pressure differential in the feedback system which represents the feedback value. This is accomplished by opening the feedback system to supply pressure so that the differential disappears.

This system is satisfactory for applications where the system courses through the neutral position frequently during operation or at least sufficiently frequently to prevent an accumulation of large error in the feedback.

For systems which require that the load be displaced off center or off the neutral position and controlled about the off position for long periods of time, it is essential to have recalibration (error correction in the feedback) take place at any number of positions. It is not sufficient to make the correction only at the neutral position.

It is one object of the present invention to provide a hydraulic position feedback system in which said errors are eliminated and/or corrected at a multitude of different system positions.

It is another object of the present invention to provide a hydraulic position feedback system incorporating automatic recalibration which takes place over a substantial range of operation of the system.

It is another object of the present invention to provide a hydraulic position feedback system in which changes in the relationship between the input position and the output position of the system are eliminated and/or corrected over a relatively wide range of operation of the system.

It is another object of the present invention to provide a hydraulic position feedback system in which recalibration takes place each time the system courses through a variable or floating center position.

It is another object of the present invention to provide an improved hydraulic position control system.

In accordance with a feature of the present invention, a hydraulic position feedback system is provided for administering a control action to a main hydraulic control valve which controls the flow of hydraulic fluid to and from an output actuator in such a manner that the actuator positions a load to positions corresponding to the position of the input of the main valve. The feedback consists of a hydraulic pressure fed to a hydro-mechanical actuator which combines with the input to the main valve so that the output is positioned corresponding to the input. Means such as described in the aforesaid copending application are provided for eliminating the feedback each time the system moves through a predetermined position and, in addition, means are provided for varying this predetermined position so that it follows the input of the system. Thus, each time the input to the system is changed, this predetermined position at which recalibration takes place is changed so that it moves along with the input position.

In a preferred embodiment of the present invention, the input to the system controls a calibration pressure regulator which produces a hydraulic pressure proportional to the input position. This hydraulic pressure is employed to shift the position of the feedback actuator at which the zero feedback pressure differential occurs and, since recalibration takes place each time the zero feedback pressure differential occurs, the position at which recalibration takes place is varied in accordance with the position of the input to the system.

One embodiment of the present invention includes two neutral position valves, one controlled by the main valve and the other controlled by the output of the system. These two valves are connected in series and supply an open hydraulic path to the feedback system so that zero pressure differential is applied to the feedback system when the two valves are open. In the present invention, the calibration pressure biases the feedback actuator and also biases the neutral position valve which is positioned by the system output. Since the main valve which positions the first neutral position valve is controlled by the feedback actuator, this first neutral position valve is also subject to the biasing force from the calibration pressure regulator. The effect of the calibration pressure on each of these neutral position valves is to shift the operating position at which the two valves open and neutralize feedback. Thus, recalibration takes place on a variable floating center which moves along with the position of the input of the system.

The use of two neutral position valves, as described above, is not always necessary. For example, if the requirement for system gain is sufficiently low and/or the system is intrinsically very stable due to operating parameters or the manner of operation, the neutral position valve controlled by the input or the main valve can be eliminated. In this case, the neutral position valve controlled by the system output supplies the open hydraulic path to provide the zero pressure differential. This single neutral position valve is subject to the calibration pressure just as described above.

Other features and objects of the present invention will be apparent from the following specific description taken in conjunction with the figures in which:

FIG. 2 is a sectional view of an arrangement of hydraulic and mechanical parts illustrating detailed structural features of an embodiment of the invention; and FIG. 3 is an enlarged view of the position actuator.

Figure 1:
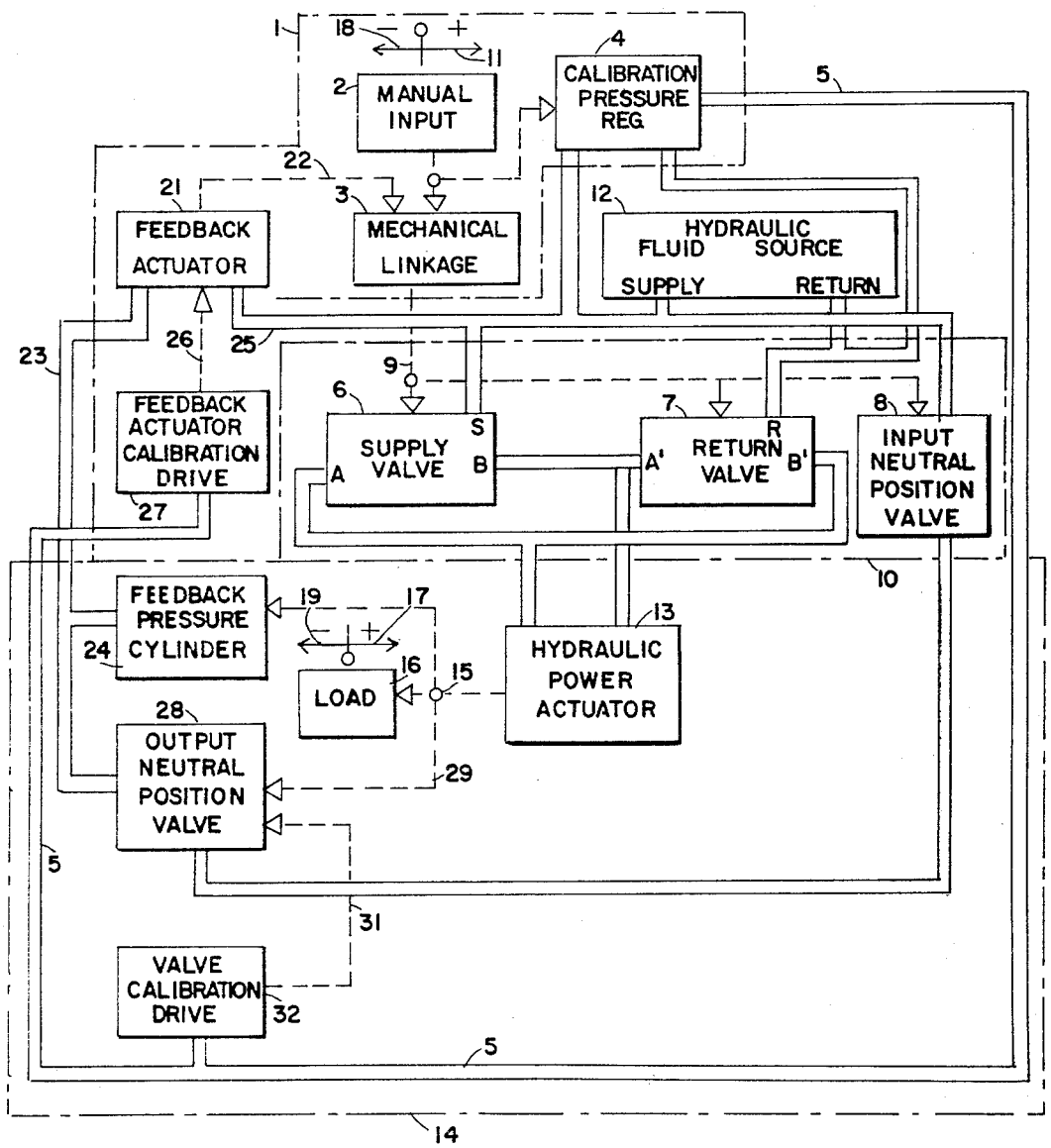
FIG. 1 is a block diagram of a hydraulic position control system incorporating features of the present invention.

Turning first to FIG. 1 there is shown a block diagram illustrating the principal hydraulic and mechanical parts and the hydraulic and mechanical connections between the parts of a hydraulic position feedback system which is mechanically controlled by a manual input and which positions a load to positions corresponding to the position of the input.

The input mechanism 1 of the system is controlled by manipulation of the manual input 2 which actuates a mechanical linkage 3 and also actuates a pressure piston in the floating calibration pressure regulator 4 so that the regulator produces in hydraulic line 5, hydraulic fluid at calibration pressure which is proportional to the position of the manual input. The mechanical linkage 3 simultaneously actuates the supply valve 6, return valve 7 and input neutral position valve 8. These valves 6, 7 and 8 are effectively ganged and operated together by, for example, a single actuating mechanism 9 from the mechanical linkage 3. The three ganged valves may be incorporated in a single unitary mechanism 10, generally referred to herein as the main control valve.

The main valve 10 is controlled by the mechanism 9 so that a manual control in the positive direction 11 of the manual input 2 causes the supply valve 6 to feed hydraulic fluid from the supply portion of the hydraulic fluid source 12 from port S to port A of the supply valve 6. At the same time, return valve 7 is actuated to feed return hydraulic fluid from port A' to port R which returns the fluid to the return portion of the source 12.

Port A of the supply valve 6 feeds hydraulic fluid to one side of the hydraulic power actuator 13 in the output system 14. The output actuator 13 includes a ram piston connected by the mechanism 15 to a load 16 causing the load to move in the direction denoted by arrow 17. On the other hand, when the manual input 2 is moved in the negative direction indicated by the arrow 18, the mechanism 9 causes the supply valve 6 ports S and B to connect and causes the return valve 7 ports R and B' to connect. Thus, hydraulic fluid from the supply is delivered to the opposite side of the actuator ram causing the load 16 to move in the negative direction indicated by arrow 19.

System feedback is applied by feedback actuator 21 and, in this embodiment, is combined within the mechanical linkage 3 with the manual input so that actuation of the mechanism 9 represents the manual input position modified by feedback. For this purpose, the feedback actuator 21 is preferably located in close proximity to the mechanical linkage 3 and the main control valve 10 and all are necessarily at the same location which may be some distance from the output system 14.

The actuator 21 is hydraulically powered and produces a mechanical action 22 which is combined with the output from manual input 2 in the mechanical linkage 3 to control the main valve 10. The feedback actuator 21 responds to movement of the load in such a manner that a movement of the load in the positive direction in response to a manual input in the positive direction causes the feedback actuator 21 to provide a mechanical input to the mechanical linkage which tends to oppose the manual input to the mechanical linkage or tends to reduce the effect of the manual input, and so the feedback is negative. More particularly, the feedback turns off the supply and return valves 6 and 7 so that there is no flow of hydraulic fluid between the actuator 13 and the source 12 once the load 16 is at a position which corresponds to the position of the manual input 2.

Two controls are applied to the actuator 21. The first control is hydraulic feedback pressure in feedback line 23 obtained from the feedback pressure cylinder 24 which is actuated by the same mechanism 15 which moves the load 16. This cylinder includes, for example, a ram which is moved therein so as to increase the pressure in line 23 when the load moves in the positive direction indicated by arrow 17. The feedback actuator 21 responds to the differential between the pressure in line 23, obtained as described, and the constant supply or reference pressure in line 25 obtained from the source 12. It is this differential which represents the position of the load and which provides the first control to the feedback actuator 21.

The second control applied to the feedback actuator 21 is the calibration drive applied to the actuator via mechanical coupling 26 from the feedback actuator calibration drive 27. This second input represents the floating calibration point and is proportional to the calibration pressure in line 5 obtained from the floating calibration pressure regulator 4. Thus, the mechanical input 26 to the feedback actuator imposes a bias on the mechanical output 22 from the actuator so that even though the pressure differential in the actuator (differential between pressure in lines 23 and 25) is zero, a magnitude of feedback is still applied via linkage 22 from the actuator to the mechanical linkage 3. Thus, the pressure differential in the actuator may be zero when the manual input 2 is positioned at other than its neutral or zero position, and this mechanical feedback and manual input are combined by the mechanical linkage 3 so that the supply valve 6 and return valve 7 are closed and the input neutral position valve 8 is open.

Under the above conditions of operation, when the load is positioned to a position corresponding to the position of the manual input 2, the output neutral position valve 28 is opened by virtue of mechanical coupling 29 between the load and the valve 28. This occurs because the output neutral position valve 28 is mechanically biased by a mechanical drive 31 from the valve calibration drive 32 which is controlled by the calibration pressure in line 5. When both the input neutral position valve 8 and the output neutral position valve 28 open, the feedback line 23 connects through these valves to the supply pressures from the source 12 and so the pressure in lines 23 and 25 are the same so that the differential pressure applied to the actuator 21 is zero. Each time this occurs, the system is recalibrated and so a subsequent administration of a control action by the manual input 2 commences from an instant of recalibration and is followed by another instant of recalibration. Each recalibration must suffice during the ensuing dynamic operation of the system until the system is once more static and the supply and return valves 6 and 7 are both closed, at which time the valves 8 and 28 again open thereby connecting line 23 to supply pressure to recalibrate the system. This recalibration may take place at any position of the system and does not require that the system proceed through the zero or neutral position in order to accomplish recalibration, because the system recalibrates between successive intervals of dynamic operation.

If system gain is sufficiently low and/or the system is inherently sufficiently stable, the input neutral position valve may be eliminated or by-passed so that the output neutral position valve 28 alone connects feedback line 23 to supply pressure to accomplish recalibration. If supply pressure is available at the location of the output actuator 13, then only four hydraulic lines are required between the output system 14 at one location and the input mechanism 1 and main valve 10 at another location.

The system shown in FIG. 1 and described above is useful, for example, on a ship or submarine which carries a control surface at an angle of attack for a substantial period of time and continuously makes small corrections to the angle of attack, but does not change the angle of attack through the neutral position from, for example, a positive angle of attack to a negative angle of attack. Using this system, continuous recalibrations occur even though the system remains continuously displaced substantially from the neutral or zero position.

FIGS. 2 and 3 illustrate the details of mechanical and hydraulic parts operating as described above with reference to FIG. 1. The parts which correspond substantially to the various parts shown in FIG. 1 in block diagram form are referred to in similar terms even though different reference numbers are employed. In FIG. 2, the feedback is hydro-mechanical just as in FIG. 1 and is applied from the feedback actuator 41 to the main control valve 42 by moving the floating ground or fulcrum 43 of the mechanical linkage 44 which conncets the manual input 45 to the valve. The main control valve 42 provides the functions of the supply valve 6, the return valve 7 and input neutral position valve 8 of FIG. 1. The fluid position actuator 46 performs the functions of the feedback pressure cylinder 24, output neutral position valve 28 and valve calibration drive 32 in FIG. 1 and the feedback actuator 41 performs the functions of the feedback actuator 21 and feedback actuator calibration drive 27 in FIG. 1.

In operation, the manual input 45 is operated by rotating the handle 47 which translates a nut 48 along a screw 49 and which moves a lever 50 about the input fulcrum 51. This in turn moves the main valve lever 53 about the floating ground 43 and positions the spool 54 within the valve housing 55. The spool 54 includes four sections 54a to 54d. Section 54b meters hydraulic fluid from the supply cavity 56 to one or the other of ports 57 or 58 which connect with the lines 59 feeding the load actuator 60. The spool sections 54a and 54c meter flow between the ports 57 and 58 and the return cavities 61 and 62.

The actuator 60 includes a cylinder 63 and ram or piston 64 which drives the lever 65 on the output fulcrum 66 so as to position the feedback pressure piston 67 and neutral position valve 77 in the position actuator 46. The piston 67 pressurizes hydraulic fluid in the cavity 68 which connects to one side 69 of the feedback piston 70 in the feedback actuator 41 via line 71. The other side 72 of the feedback piston is fed directly from the hydraulic fluid supply.

In operation, when the manual input 45 is operated so that the nut 48 travels along the input scale 73 in the positive direction or to a positive position, lever 53 is moved so that the main spool section 54b opens port 57 to fluid supply pressure. At the same time, section 54c opens port 58 to the return 62. This causes the output ram 64 to move in the positive direction as indicated on the output scale 74 and move the piston 67 to the left so as to decrease the pressure in cavity 68 which, via line 71, decreases the pressure on side 69 of the feedback piston 70 which moves then in the negative direction indicated by arrow 75 and displaces the floating ground 43 to the left or negative direction. This shift of the floating ground 43 in the negative direction, indicated by arrow 75, effectively cancels the manual control action on the spool 54 so that the flow of hydraulic fluid between the load actuator 60 and the supply and return cavities is stopped. This locks the output ram in position. Thus, it is seen, the hydro-mechanical position feedback is negative feedback and causes the output scale reading to follow the input scale reading.

The recalibration or position correction to the feedback system is accomplished by connecting the cavity 68, which controls the position of the feedback piston, to supply pressure. The cavity 68 is connected to supply pressure when the input and output neutral position valves 76 and 77 open. The valve 77 opens when groove 78 in the feedback pressure piston 67 is in registry with the ports 79 and 80 in the floating calibration sleeve 81 shown more clearly in FIG. 3. These ports connect the cavity 68 to supply pressure via the input neutral position valve 76. The input neutral position valve 76 is formed between spool sections 54c and 54d by an annular groove between these sections which provides passage of supply pressure between the ports 82 and 83 when the spool 54 blocks flow to and from the actuator 60.

The calibration pressure regulator 85 is actuated by lever 50 of the manual input 45. This regulator consists of a housing 86 containing a return chamber 87 and a regulating pressure chamber 88 connected by a cylinder 89 which is fitted with the calibration pressure piston 90. The piston 90 is loaded by a spring 91 which bears against a plate 92 at the end of the piston which projects into the return cavity 87 and this spring is, in turn, loaded by the lever 50 which moves plate 93 in the return cavity. Thus, when the manual input rider 48 moves in the positive direction along the scale 73, the load on the spring 91 increases and piston 90 increases the pressure in the calibration pressure cavity 88 and so the pressure in the cavity 88 varies proportionally to the position of the manual input 45.

The cavity 88 feeds hydraulic fluid calibration pressure, via line 95, to the feedback actuator calibration drive 96 at one end of the feedback actuator 41 and also to the valve calibration drive cyclinder 97 in the fluid position actuator 46. This calibration pressure in drive 96 biases the position of the feedback cylinder 70 so that even though the pressure in chambers 69 and 72 of the feedback actuator are the same (supply pressure) the piston 70 will be displaced from its spring centering position established by springs 98 and 99. Thus, the position of the floating ground or fulcrum 43 is positively or negatively biased in accordance with the position of the manual input 45. Likewise, the calibration sleeve 81 in the fluid position actuator 46, is compelled by the pressure in the cavity 97, on one side of the sleeve, to move from its spring centered position established by the action of the springs 100 and 101 on each side of the sleeve. When the sleeve 81 is positioned in this manner, away from its spring centered position, the position of the output actuator ram 64 at which ports 79 and 80 in the sleeve 81 (see FIG. 3) connect via the groove 78 in the piston 67, is changed and depends upon the position of the manual input 45.

The ports 79 and 80 in the sleeve 81 and the opening 78 in the piston 67 combine to function as the output neutral position valve 28 described above with reference to FIG. 1 and the action of the calibration pressure in the chamber 97 upon the position of this value is the equivalent of the action of the valve calibration drive 32 described above with reference to FIG. 1. Thus, incorporated within the single unitary fluid position actuator 46 are the functions of the feedback pressure cyclinder 24, the output neutral position valve 28 and the valve calibration drive 32 shown in FIG. 1.

An enlarged view of the piston 67, sleeve 81 and ports 79 and 80 leading from the sleeve to the lines 71a and 83a is shown in FIG. 3.

During dynamic operation when the nut 48 is off-set in the positive direction, the main spool 54 is positioned so that hydraulic fluid from the supply cavity 56 is fed to port 57 so that the output actuator ram 64 moves in the positive direction. When this occurs the feedback fluid pressure fed from cavity 68 to cavity 69 in the feedback actuator 41 decreases, so that the feedback piston 70 moves the floating fulcrum 43 in the negative direction, as indicated by arrow 75, which tends to move the main spool 54 to the left in opposition to the motion to the right caused by the manual input 45. When the output ram 64 reaches a position which corresponds to the initial off-set provided by the manual input 45, dynamic operation ceases and the spool 54 blocks flow between the ports 57 and 58 which feed the output actuator from the supply and return cavities in the main control valve 42. When this occurs, the input neutral position valve 76 is open so that supply pressure is fed from port 82 to port 83. Meanwhile, the calibration pressure in line 95 will have positioned the floating calibration sleeve 81 in the actuator 46 so that ports 79 and 80 in the sleeve are open to each other when the output ram 64 reaches a position corresponding to the initial off-set, and this completes the path connecting line 83a to line 71a so that cavity 68, line 71 and cavity 69 are all open to supply pressure. Thus, the pressure differential across the piston 70 of feedback actuator 41 is zero and a new but displaced neutral or zero position is established for the load by the calibration pressure from regulator 85 which drives piston 96 and seleve 81. And, the floating fulcrum 43 continues to maintain a piston such that feedback to the main spool 54 is equal to the initial off-set to the spool applied by the manual input 45. As a result, the system remains static and recalibration occurs until a new neutral or center position is selected.

The recalibration occurs each time the pressure differential applied to the feedback actuator 41 is zero. In the system shown in FIG. 2, this occurs regardless of the system position each time the system becomes static. In other words after each incidence of dynamic operation of the system and upon arriving at a static condition whether the system is positioned in a positive or negative position, recalibration occurs by connecting the feedback through the two neutral position valves to supply pressure so that the differential is zero.

The system described above with respect to FIG. 2 includes two neutral position valves 76 and 77, the latter being subject to calibration pressure as well as output position. When two valves are employed as described, recalibration occurs when the system is static. The two valves are preferred to insure stable operation particularly in high gain systems. If system gain is relatively low and the system is unlikely to encounter operating conditions which produce unstable operation, then the input neutral position valve 76 may be eliminated and supply pressure may be provided directly to line 83a which feeds the output neutral position valve 77.

A bias mechanism may also be employed in the system of FIG. 2 to add a third control action or bias to the mechanical linkage 44 which positions the spool 54 to control the load actuator 60. In this case, the mechanical linkage is not a simple lever as shown but preferably is constructed and operated as the so called tripod input lever described in the copending application entitled, "Multi Arm Lever Mechanism," by Paul F. Hayner and Lawrence W. Sharpe, Ser. No. 587,893, filed on even date herewith and assigned to the same assignee as is the instant application.

The tripod input lever would feed three mechanical actuations to the spool 54 of the main control valve 42. These are: the manual input from a device such as 45, a feedback actuation from a feedback actuator such as 41 and a bias actuation from a bias actuator which responds to a bias signal. All three actuations would be instrumental, via the tripod input lever to position the spool in the main valve.

The tripod input lever is so constructed that the manual input can override both the feedback and the bias. Since the bias can represent a predetermined schedule of operation or an outside parameter, the system can operate as an automatic pilot subject to being overridden by the human operator.

This completes descriptions of a general and specific embodiment of the present invention of a hydraulic positioning system including position feedback with means for correcting errors in the feedback system and thereby recalibrating the feedback system at substantially all positions during operation.

What is claimed is:
1. A hydraulically operated positioning system comprising,
   a source of pressurized hydraulic fluid,
   means for driving a load,
   input means,
   means responsive to said input means for controlling the flow of said hydraulic fluid to said driving means,
   feedback means responsive to said driving means coupling said driving means to said control means,
   whereby said driving means and said control means function in synchronism moving together to related positions, and
   means for eliminating the response of said feedback means to said driving means when said system is at any one of a multiitude of positions.
2. A system as in claim 1 and in which,
   said response of said feedback means is eliminated when said system is static at any one of a multitude of static positions.
3. A system as in claim 1 and further including,
   means directly controlled by said input means for controlling said feedback means.
4. A system as in claim 3 and in which,
   said means for controlling the flow of fluid comprises a mechanically controlled valve having a mechanical input thereto, and
   said feedback means is hydro-mechanically connected to said mechanical input.
5. A system as in claim 3 in which,
   said means directly controlled by said input means produces a calibration fluid pressure representative of the position of said input means and further includes,
   feedback actuator means responsive to said calibration fluid pressure, and
   means for coupling the output of said feedback actuator means to said means for controlling the flow of fluid.
6. A system as in claim 5 and further including,
   means responsive to said load driving means for producing a feedback pressure,
   means for applying said feedback presure to said feedback actuator means,
   a source of reference pressure, and
   means for applying said reference pressure to said feedback actuator,
   whereby said actuator means is responsive to the differential between said feedback pressure and said reference pressure.
7. A system as in claim 6 and in which,
   said feedback actuator means includes a spring centered feedback piston which is mechanically connected to said means for controlling the flow of fluid,
   said feedback piston is driven against said springs, by the presure differential, and
   said feedback piston is displaced by said calibration fluid pressure.
8. A system as in claim 6 and in which,
   said means for eliminating the response of said feedback includes means for substantially nullifying the effect of said differential pressure on said feedback actuator means.
9. A system as in claim 8 and in which,
   said means for nullifying includes valve means which connects said feedback pressure to said reference pressure to cause said nullification.
10. A system as in claim 8 and in which,
    said means for nullifying includes at least one valve controlled by said driving means which opens said feedback presure to said reference pressure to cause said nullification.

11. A system as in claim 9 and in which,
said means for nullifying includes two valves in series, one of said valves being controlled by said driving means and the other being controlled by said input means.

12. A system as in claim 11 and in which,
said valves in series are controlled to simultaneously open when said system is in a static condition to connect said feedback pressure to said reference pressure.

13. A system as in claim 12 and in which,
said reference pressure is equal to the pressure of said source of pressurized fluid.

14. A system as in claim 12 and in which,
said means for producing a feedback pressure, and said series valve controlled by said driving means are combined so that functional parts of each are shared, and
said combination is responsive to said driving means and said calibration pressure.

15. A system as in claim 1 and further including,
manually operated means connected to said controlling means, and
biasing means connected to said controlling means and responsive to a preselected parameter,
whereby said manually operated means can be actuated by an operator to override said biasing means in the operation of said system.

References Cited

UNITED STATES PATENTS

| | | | |
|---|---|---|---|
| 1,983,385 | 12/1934 | McLaughlin | 91—388 |
| 2,320,508 | 6/1943 | Burns et al. | 91—388 |
| 3,171,330 | 3/1965 | McCombs | 91—388 |

PAUL E. MASLOUSKY, *Primary Examiner.*

U.S. Cl. X.R.

91—1, 189, 388, 422